June 22, 1943.  W. T. JOHNSON ET AL  2,322,449
BRAKE APPARATUS FOR RAILWAY CARS
Filed Oct. 1, 1941
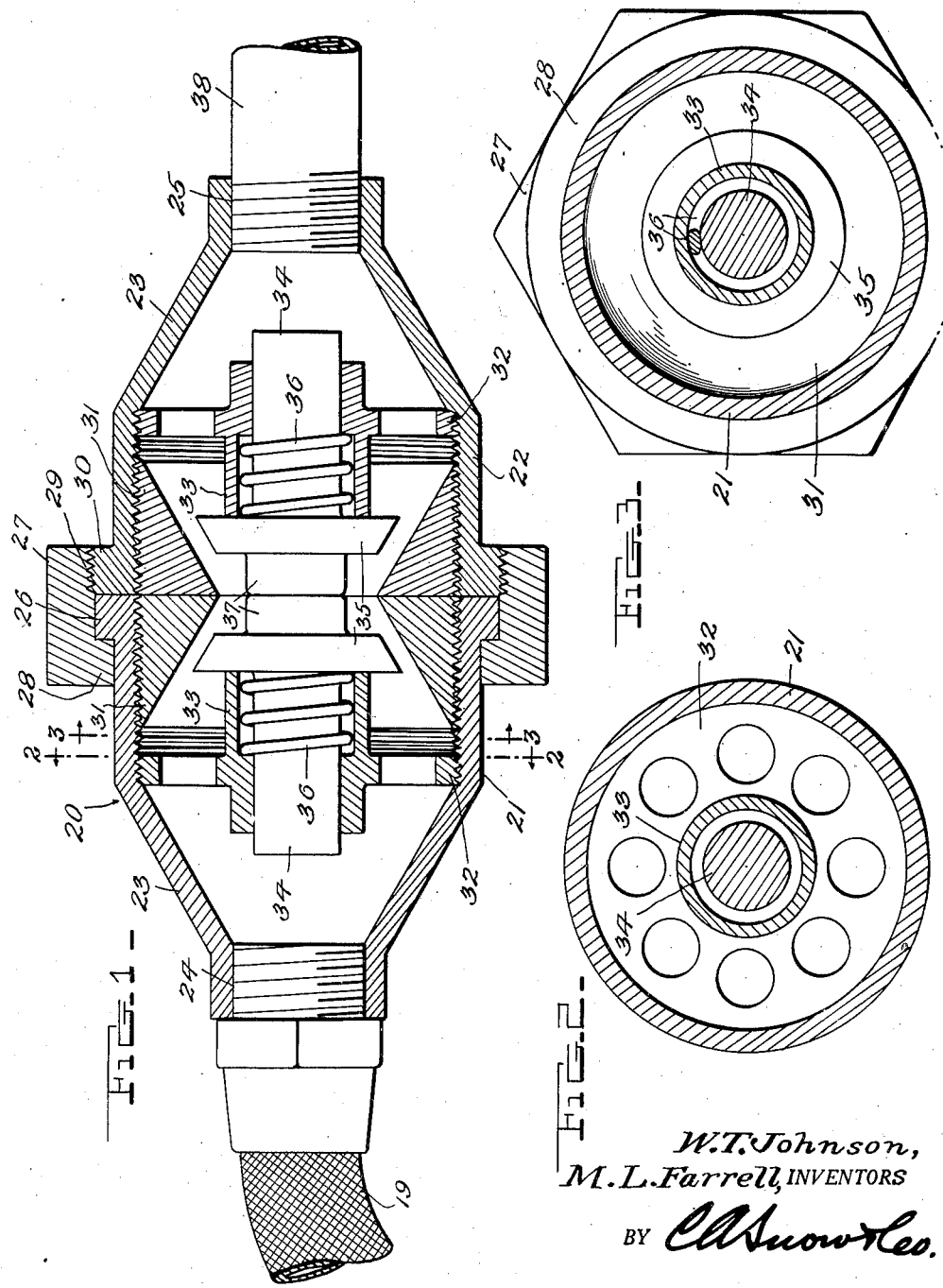
W.T.Johnson,
M.L.Farrell, INVENTORS
BY *C.A.Snowfleo.*

Patented June 22, 1943

2,322,449

UNITED STATES PATENT OFFICE 2,322,449

BRAKE APPARATUS FOR RAILWAY CARS

William Toggy Johnson and Marion Lucille Farrell, Dwight, Ill.

Application October 1, 1941, Serial No. 413,208

1 Claim. (Cl. 284—18)

This invention relates to valves designed primarily for use in connection with the brake apparatus of railway cars, one of the objects being to provide a structure wherein the valve housing is made up of detachably connected sections, there being a new and novel arrangement of valves and valve seats in the sections so constructed and located as to permit separation of the members of the housing without loss of fluid.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1 is a central longitudinal section through the cut-off valve.

Figure 2 is a section on line 2—2, Figure 1.

Figure 3 is a section on line 3—3, Figure 1.

Referring to the figures by characters of reference, 19 designates a pipe which opens into one end of a shut-off valve indicated at 20. This valve is made up of opposed members 21 and 22 which abut at one end and have their upper ends tapered, as at 23 to ports 24 and 25 respectively. Pipe 19 opens into the port 24.

An annular rib 26 is formed on the member 21 at that end thereof remote from port 24 and is surrounded by a coupling ring or union 27. This ring is rotatable on member 21 and has an interior annular flange 28 adapted to thrust against rib 26. That portion of the ring projecting beyond the member 21 is interiorly screw-threaded as at 29 so as to engage external threads on an annular rib 30 carried by the member 22. Thus by tightening the ring on the two members they can be drawn together securely at their abutting ends to form a tight casing.

Rings providing beveled valve seats are shown at 31, these being insertible into the respective sections and held thereto by screw threads. The inserted seat rings are adapted to abut as shown so that an opening is thus provided which is surrounded by the two seats. However they can be adjusted away from each other by rotating them in their sections, thereby to insure a uniform flow of fluid past the two valves when open.

Screwed into each of the sections 21 and 22 and located adjacent to the tapered portions thereof are apertured disks 32 which have guide sleeves 33 extended therefrom toward each other. In each disk is slidably mounted the stem 34 of a tapered valve 35 and mounted on this stem within the sleeve 33 is a coiled spring 36 which serves to urge the valve toward the opposed valve. A central boss 37 projects from each valve and when these valves are in their normal or retracted positions thrusting against the guide sleeves 33, the bosses abut as shown in Figure 5, these abutting ends occupying substantially the same plane as the abutting ends of the sections 21 and 22. Thus the valves are held normally spaced from the respective seats so that fluid can flow freely around them. The sleeves 33 act as stops so that the springs 36 need not be fully compressed in order to limit the movement of the valves away from each other. Consequently there is no danger of weakening or breaking the springs because they are thus relieved of excessive strain due to full compression. Furthermore, as the disks 32 which carry the guide sleeves or stops 33 are adjustably mounted because of their screw-threaded engagement with the members 21 and 22, it becomes possible to adjust the positions of these sleeves or stops so that when the valves are open thereagainst they will be accurately positioned relative to the previously adjusted seats.

A pipe 38 extends from the port 25.

Should it be desired to separate the members of the valve housing or casing, the procedure would be to uncouple section 21 of the shut-off valve from section 22. This will withdraw valve 35 in section 21 from the other valve which latter will instantly close against its seat. When the two sections are reassembled, both valves will come together and be held open.

What is claimed is:

In hydraulic brake apparatus, a cylinder connection including detachably connected valve sections, opposed seats adjustably mounted in the respective sections, opposed valves in the respective sections, a guide adjustably and removably mounted in each section, each guide constituting an adjustable stop for the valve when opened, coiled springs housed in the guides and engaging the respective valves for holding the valves pressed together, each valve constituting means for holding the other valve off of its seat while the sections are connected and the valves in contact with each other and each guide being proportioned to prevent complete compression of the spring therein.

WILLIAM TOGGY JOHNSON.
MARION LUCILLE FARRELL.